United States Patent

[11] 3,562,408

[72] Inventors Carter C. Collins;
Frank A. Saunders, Mill Valley; Julius M. Madey, San Anselmo, Calif.
[21] Appl. No. 804,550
[22] Filed Mar. 5, 1969
[45] Patented Feb. 9, 1971
[73] Assignee The Institute of Medical Sciences
San Francisco, Calif.

[54] HAPTICON VISUAL SUBSTITUTION SYSTEM
22 Claims, 14 Drawing Figs.
[52] U.S. Cl. ..................................................... 178/5.2,
35/35; 178/6.8, 178/7.2; 313/95, 313/98
[51] Int. Cl. ..................................................... H04n 7/18,
H04n 9/02
[50] Field of Search ........................................... 35/35.1;
178/6 IND, 6, 6.8, 5.2, 5.4; 313/95, 98

[56] References Cited
UNITED STATES PATENTS
2,327,222   8/1943   Sell.............................. 35/1

OTHER REFERENCES
Science 9/4/53 pp 277— 278 " Perception by the Skin of Electrically Induced Vibrations" Vol. 118
Electronics 7/10/67 pp 44— 45

*Primary Examiner*—Robert L. Richardson
*Attorney*—Hall, Pollock and Vande Sande

ABSTRACT: A multiple anode photomultiplying image tube is provided employing an image intensifier structure and an array of anodes for converting visible information into patterned electrical signals. A modulating source associated with the tube assures that the electrical signals exhibit particular characteristics; and such signals are conveyed to an array of electrodes in contact with the skin of a subject, to be perceived by the subject as a conceptual image. The photomultiplying image tube can be mounted in or on spectacles, or on the head of the subject. Arrangements are disclosed for providing black and white information, color information, and stereoscopic information to the subject, and for using the eyes to aim the system at any desired object.

INVENTORS
C. C. COLLINS
F. A. SAUNDERS
J. M. MADEY

BY *Hall, Pollock & Vande Sande*

ATTORNEYS

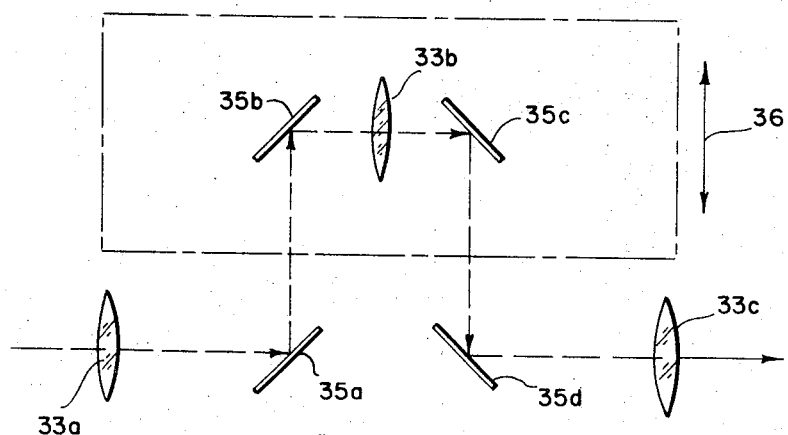
FIG. 3A
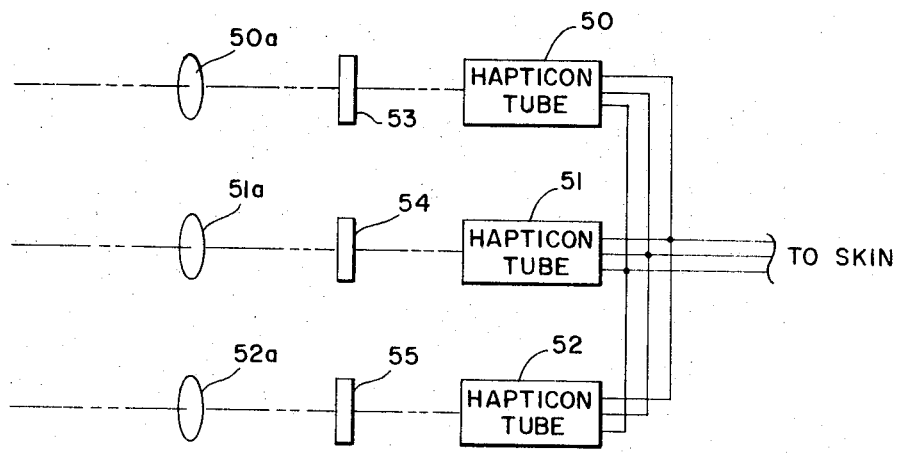
FIG. 5A
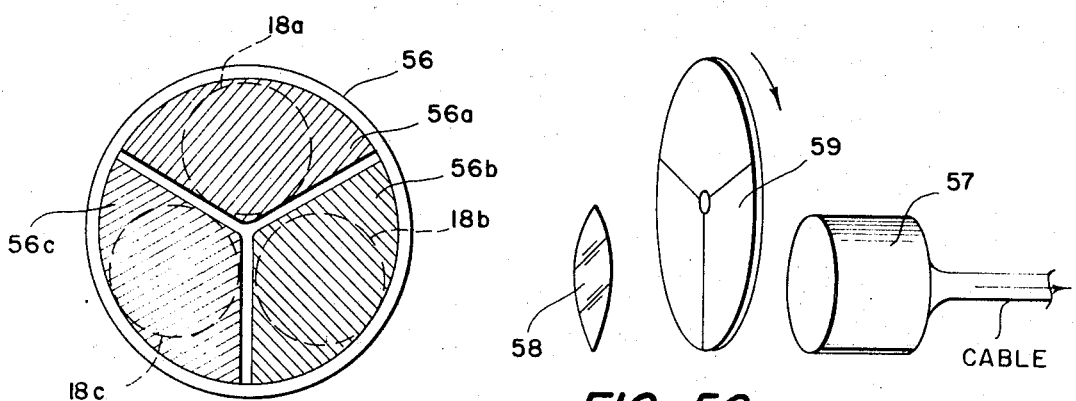
FIG. 5B
FIG. 5C
INVENTORS
C. C. COLLINS
F. A. SAUNDERS
J. M. MADEY
BY Hall, Pollock & Vande Sande
ATTORNEYS

PATENTED FEB 9 1971

3,562,408

INVENTORS
C. C. COLLINS
F. A. SAUNDERS
J. M. MADEY

BY *Hall, Pollock & Vande Sande*

ATTORNEYS

3,562,408

HAPTICON VISUAL SUBSTITUTION SYSTEM

BACKGROUND OF THE INVENTION

Blindness has always been one of the most difficult of all human afflictions to treat. Almost all therapeutic approaches to date have been designed to rehabilitate a blind person to a nonvisual world. However the relatively recent availability of sophisticated electronic equipment has suggested to various workers in the field that it may be possible to replace a lost sense of vision by conveying signals to the brain in some alternative fashion.

In searching for an alternative modality to replace vision it has been found that the integument of a subject is the only organ besides the eye with receptors organized to receive stimuli to be interpreted and distributed in two dimensions of space, with temporal integrating capability. It is richly innervated, and offers an excellent sensory receptor area for visual substitution system. In prior arrangements, artificial receptors such as TV cameras have delivered images to the skin by means of an array of tactile stimulators. It has been found that, with training, a blind subject can interpret the tactile representation of an optical image picked up by the television camera, and thus essentially "see" through his skin. The image on the skin sets up patterns of nerve pulses in the cutaneous nerves which arrive at the brain as coded pulse patterns carrying optical information. The brain then decodes this information based on experience acquired in training. Thus, a healthy intact sensory modality (cutaneous sensation) becomes a means for carrying "visual" information from an artificial receptor such as a television camera.

Various problems have arisen with systems suggested heretofore. Visual substitution systems employing a television camera associated with a tactor array mechanically vibrating on the subject's skin tend to be rather large, bulky, and heavy, thereby limiting or actually eliminating mobility of a person utilizing the visual substitution system. These system limitations are aggravated by the need for relatively high capacity power sources, and associated cooling arrangements, necessary for proper operation of a mechanically vibrating arrangement of tactors.

In an effort to reduce somewhat the weight of a visual substitution system, it has been suggested that direct electrical stimulation of the skin can be used in place of vibrating tactors. Even with this modification, however, the type of artificial receptor which must be used (e.g., a TV camera) still makes the overall system relatively bulky, and of limited mobility. No truly practical alternative has been available heretofore for a TV camera type of receptor. Any possible alternatives which haven been suggested in prior patents or literature have, in practice, been found incapable of producing electrical stimuli of sufficient strength and/or definition to achieve realistic conceptual images.

In addition, earlier suggestions for electrical stimulation systems have been subject to operational and utilizational problems arising out of the fact that, physiologically, only a small separation has been found between the perceptual threshold and the pain threshold for electrical stimulation. Prior electrical stimulation systems have accordingly been erratic in operation, producing stimuli which are sometimes ineffective in producing a conceptual image, and which, at other times, cause the subject to experience pain.

The present invention, recognizing these disadvantages and problems of visual substitution systems suggested heretofore, is concerned with improved systems of the general type discussed, but characterized by less weight and bulk with resultant greater mobility of the entire system; less power consumption; electrical stimulation capable of achieving consistent, reliably pain-free, and meaningful levels of stimulation; and adaptation to color and stereoscopic sensory perception, as well as black and white perception.

SUMMARY OF THE INVENTION

In accordance with the present invention, a visual substitution system is provided employing a novel photomultiplier tube incorporating an extended area photocathode an array of collector anodes, and an image intensifier structure therebetween, for example: a microchannel plate, "venetian blind" structure or other device. This tube, which is termed herein a "hapticon," is sufficiently small and light in weight to permit its mounting directly on a pair of spectacle frames, or in a relatively small receptor unit carried directly on the head of a subject. The hapticon tube is associated with a pulse train generator or modulating source adapted to convert an optical image, impressed on the photocathode and intensified by the tube's image intensifier structure, into pulses at the tube's anode array which are then coupled via appropriate conductors to an associated array of skin electrodes in engagement with the subject.

Attention is given to the characteristics of the pulses employed for electrical stimulation, to assure that the stimulation achieves significant but reliably pain-free stimulation of the subject's skin. More particularly the pulses are individually of rectangular configuration between 1 and 500 microseconds wide. Such pulses are timed to occur at repetition rates up to 10,000 pulses per second. The "off" time between individual pulses permits at least partial recovery of the skin, repolarization of the nerve cell membrane, and/or elimination of metabolic by products. To enhance these recovery effects, the pulses are, in a preferred embodiment of the invention, applied in "bursts" of a number of short pulses, with relatively longer time intervals between each burst; and, in a preferred embodiment, the burst repetition rate may range between 25 and 100 pulse bursts per second. By observing these conditions, fading, habituation, adaptation, and other phenomena descriptive of changing sensation levels are avoided, and gross skin changes are eliminated even though the stimulation may occur constantly for a number of hours.

In its preferred form, the potential of the skin stimulating pulse is electronically controlled so as to produce constant current pulses in the skin having a magnitude sufficient to achieve meaningful but pain-free stimulation; and a manual control is incorporated in the equipment to permit adjustment of these parameters by the subject thereby to accommodate various skin impedances and intensity preferences. Such control means, and the waveform generator itself, are incorporated into physically small and lightweight circuit arrangements capable of being mounted, for example, within the temples of a pair of spectacles. As a result, the overall receptor, electronic control, and manual adjustment facility represent compact, lightweight components which can be readily worn on the head of a subject, or hand held, with substantially no physical discomfort.

In preferred forms of the invention, zoom optics may be incorporated into the receptor to permit the subject, at will, to examine an object in varying degrees of detail. Other features of the system include provision for color interpretation through the use of one or more hapticon tubes of the type described, associated with three primary filters and with three separate and unique carrier or modulating frequency sources conveying information as to each primary color to the subject. Stereoscopic presentation is also achieved through the use of optical arrangements adapted to shift periodically the subject's point of view, in cooperation with a separate stimulating system conveying information to the subject as to the changing view point. Still other arrangements are provided wherein ocular feedback is achieved through the use of contact mirrors worn by the blind eyes of the subject and making use of the subject's normal eye movements to direct the angle of view of the hapticon camera receptor.

BRIEF DESCRIPTION OF THE DRAWINGS

FIG. 3A is a diagram of one form of zoom optics which may be employed in conjunction with the hapticon of the present invention;

FIG. 5A, 5B, and 5C respectively illustrate three different hapticon systems constructed in accordance with the present invention adapted to convey color information;

DESCRIPTION OF THE PREFERRED EMBODIMENTS

Figure 1:
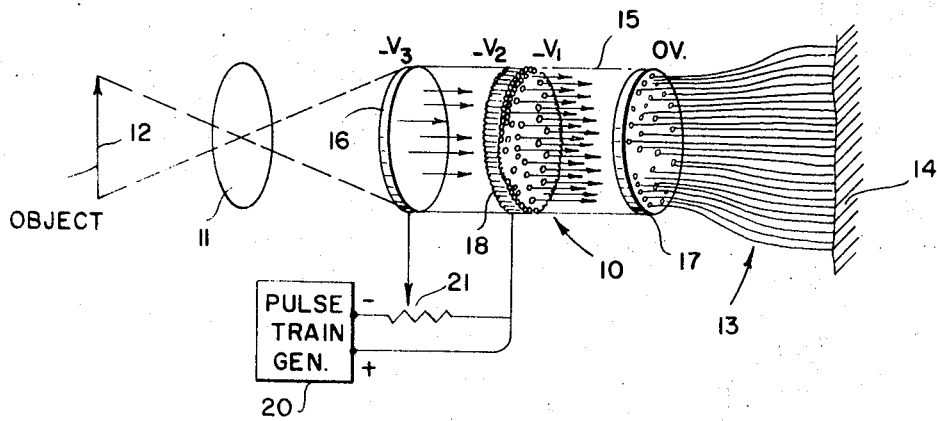
FIG. 1 is a diagrammatic illustration of a hapticon system constructed in accordance with the present invention.

FIG. 1 illustrates a hapticon visual substitution system of the general type employed in the various embodiments of the present invention. The system comprises a photomultiplier image tube 10 of the particular construction to be described more fully hereinafter, and termed a "hapticon." Tube 10 is associated with an optical system diagrammatically illustrated at 11 for imaging an object 12 on the face of tube 10; and output signals from the tube 10 are conveyed by a conductor bundle 13 to a matrix of skin stimulating electrodes in contact with the skin 14 of a subject. The electrode matrix in contact with the skin 14 may take the form described in the copending U.S. application of C. C. Collins et al., Ser. No. 800,948 filed Feb. 20, 1969, for "Flexible Cutaneous Interface."

Tube 10 comprises an evacuated envelope 15 enclosing a distributed photocathode 16, an anode array 17 of collector electrodes, and an image intensifier structure positioned between elements 16 and 17 and consisting of a secondary emission electron multiplier structure such as a microchannel plate 18 exhibiting an electron gain of between 10,000 and 10,000,000. Microchannel plates of the type comprising the image intensifier structure are in themselves known and are presently being manufactured by Zenith Radio Corp., Bendix Corp. Varian Associates, and others.

Microchannel plate 18 comprises a glass disc, resembling a thin fiber optics plate, having cored tunnels or holes etched therethrough. The disc or plate 18 may be the size of a small coin only 1 to 3 mm thick; and a 1 inch diameter plate can be provided with more than a million holes exhibiting an interior surface area of more than 850 square centimeters. The inside of each of the etched-out glass tubes formed in plate 18 is coated with a few Angstroms of dielectric oxide. This high resistance coating, which acts as a source of secondary electrons, also serves to keep the electrons moving down each etched-out tube by varying the electric field across the ends of the tube. Metal contacts evaporated over the opposing faces of the disc or plate 18 allow potentials to be applied to the ends of the tubes in the microchannel plate; and these differing potentials have been illustrated in FIG. 1 as $-V_2$ and $-V_1$. Photocathode 16 is maintained at a potential of substantially $-V_3$, and the collector anode electrodes 17 are at substantially ground potential. The absolute magnitude of $V_3$ is greater than that of $V_2$, which is in turn greater than that of $V_1$.

In the operation of the system shown in FIG. 1, and disregarding for the moment the function of pulse train generator 20 (to be described), an image of object 12 focused by optical system 11 on photocathode 16 causes photoelectrons to be emitted from photocathode 16. These photoelectrons are accelerated toward the rear of the tube by an acceleration potential $(-V_3) - (-V_2)$ existing between photocathode 16 and the front face of microchannel plate 18. These accelerated electrons enter the front ends of the several tubes formed in plate 18, and dislodge secondary electrons from the walls of said tubes. A field gradient voltage $-V_2 - (-V_1)$ creates a longitudinal electric field that pulls these electrons down the tubes, producing even more secondary electrons from the tube walls. Plate 18 thus acts as a multiplying structure consisting of collimating tubes (although other similar structures such as multiple "venetian blind" surfaces or the like could be used); and the repeated secondary emission occurring within each tube produces gains in the order of $10^6$ without appreciable lateral diffusion of the amplified electron image.

The multiplied electron image continues to be accelerated by a uniform acceleration potential between the downstream face of plate 18 and the collector anode array 17, and the resultant electron image beam current is then intercepted by the various anodes constituting array 17. The several anodes in array 17 are individually coupled to corresponding conductors in the conductor bundle or cable 13, and electrical stimulation signals are thus conveyed by the said conductors to suitable skin electrodes in contact with the subject's skin 14 to effect image patterned electrical stimulation of the skin for the purposes described previously.

In order to avoid irritation with long term use, no DC polarizing current should flow in the skin electrodes. Therefore, either transformer or capacitor coupling should be employed between each anode in array 17 and its respective skin electrode, to block DC current. Coupling arrangements of this type can be effected by appropriate printed and/or integrated circuit techniques, or by discrete transformer or capacitor components if size, cost, etc. permits.

In a preferred embodiment of the present invention microchannel plate 18 is provided with, for example, 10,000 holes cooperating individually with, for example, 1,000 anodes in array 17; and in such an arrangement, each anode collects electron image beam current for ten multiplier tubes. The overall tube 15 can be conveniently fabricated to exhibit an external diameter of 1½ to 2 inches, and a length of between 1 cm. and 1 inch. The photocathode itself may take the form of a photoemissive deposit on the inner front face of envelope 15, and can, for the dimensions specified, exhibit an active diameter of substantially 1 inch. The transparent front face plate can be substantially 2 mm thick. Plate 18 can be substantially 3 mm thick, and the rear (anode) faceplate can be substantially 2 mm thick. The remaining length dimensions between the elements 16, 18 and 17 provide for adequate spacing between the several elements to avoid possible arcing; and the actual dimensions chosen for such spacing are dependent upon the magnitudes of the several potentials applied to the various elements of the hapticon tube 10.

It will be appreciated that the size of hapticon tube 10 is sufficiently small to to allow ready mounting of the tube in a spectacle frame to replace the glass lenses which such a frame might otherwise carry. In such a location, an efficient, lightweight, and small optical imaging device of short focal length may be readily mounted in front of the hapticon photocathode surface to image an object on photocathode surface 16. Considerations of this type will be discussed subsequently in reference to FIGS. 3 and 4.

The skin electrodes in contact with skin 14 are relatively small in diameter, and each electrode is preferably of coaxial configuration comprising a central stimulating electrode having a diameter in the order of one-eight inch surrounded by a coaxial ground electrode having a diameter in the order of three-sixteenth inch. Other configurations can be used such as random, linear or hexagonal arrangement of nonconcentric, noncoaxial, or monopolar electrodes. The center to center electrode spacing between the several electrodes may be in the order of one-fourth to one-half inch when applied to the skin of the back, but can be of lesser size and spacing, e.g., one-eight inch center to center if they are to be applied to the scalp where the spatial resolving power is greater. Small diameter coaxial electrodes of these types limit current spread to the immediate surface of the skin, thus tending to restrict stimulation to touch rather than to deeper (dull) pain receptors; and, when energized in the manner to be described, achieve painless stimulation which has been described variously as "vibration," "buzz," "touch," or "tickle."

In order to assure that the beam current intercepted by the anodes in array 17, and coupled to the subject's skin 14, provides meaningful, but reliably pain-free electrical stimulation, a pulse train generator 20 is provided to pulse and otherwise control the potential between elements 16 and 18, or across element 18, or between elements 17 and 18, thereby to cause the electrical stimulation to occur as pulses exhibiting preselected characteristics. Anodal pulse trains having a frequency of 60 Hz., employing pulses having a width of 1 to 500 microseconds, have been employed to produce skin currents of 2 to 20 milliamperes peak; the current selected depending on pulse width. Adequate stimuli have been found to be as small as 50 microwatts, and the subjective level of sensation can be accurately predicted from the current, pulse width, and number of pulses in a train. The sensation of continuously applied pulses or pulse trains rapidly falls from an initial subjective level in less than one-half second. The electrical resistance of the back is lower than that of the hands or arms. A stimulating current fall time of 2 microseconds is observed due to the shunt capacity of the skin encountered by the electrode. The equivalent circuit of the skin of the back appears as 40,000 ohms in parallel with 10 picofarads. An electrolytic conducting electrode paste or lotion can reduce this to 10,000 ohms for more constant and reliable skin stimulation.

Figure 2A:
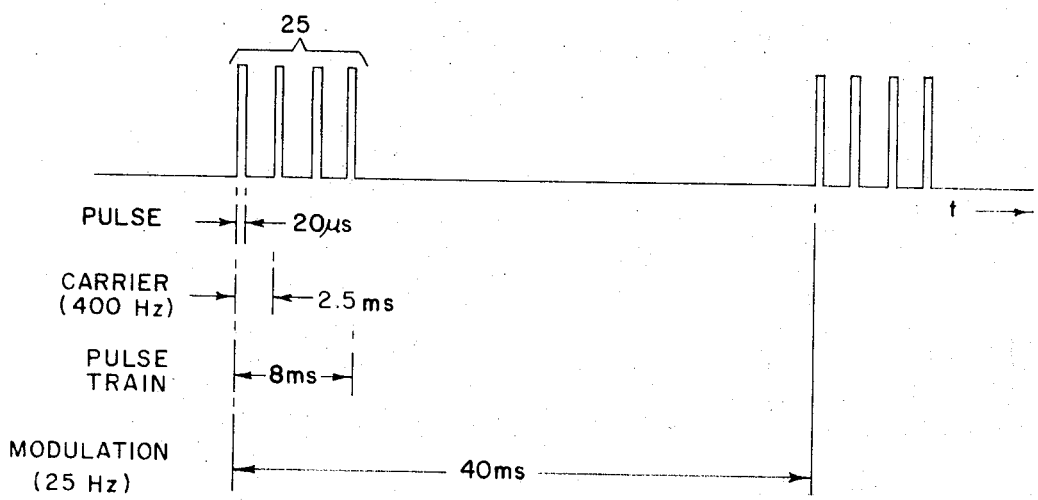
FIGS. 2A through 2C inclusive illustrate some of the operating characteristics of the FIG. 1 system.

To achieve proper electrical stimulation, the pulse train generator 20 is provided to control the characteristics of individual pulses applied to the skin, the characteristics of a burst of such pulses applied to the skin, and, optionally, the characteristics of a train of such pulse bursts. Unit 20 is illustrated in FIG. 1 as being connected between photocathode 16 and plate 18; but it may, alternatively, be connected across plate 18, or between plate 18 and anodes 17. Pulses are generated in unit 20, e.g., having the waveform shown in FIG. 2A. Each individual pulse in the pulse train should be between 1 and 500 microseconds in width, and should exhibit a rectangular waveform. FIG. 2A contemplates, for purposes of illustration only, pulses having widths of 20 microseconds. Pulse widths in the range of 10 to 100 microseconds have been found to be comfortable, nonhabituating, easily recognizable as light vibration, and quite different from the usual sensation associated with electric shock. The sharp leading edge of each pulse is believed to achieve capacitive piercing of the external skin layer of dead epithelial cells, oil, etc., without the need for abrading the cells, or mechanical puncturing. The most useful pulse repetition rates of the carrier include frequencies up to 10,000 Hz.; in other words, the time between pulses can be as low as 100 microseconds. The optimum rate (depicted in FIG. 2A) has been found to be about 400 Hz., and yields a period of 2.5 milliseconds. If each individual pulse is, for example, 20 microseconds wide, 2,480 microseconds of the period is "off-time," and is available for recovery, repolarization of the nerve cell membrane, and/or elimination of metabolic byproducts.

While a single pulse is capable of eliciting a sensation, it has been found that stimulation is more reliably felt when a burst of such pulses is applied. The sensation thus is temporarily integrated physiologically in that bursts of e.g. 8 pulses are perceived as stronger stimulation than bursts of e.g. 4 pulses, all other factors being equal. Such pulse bursts are effected by unit 20, which includes means for modulating the individual pulse carrier by an "on-off" switching action of the type shown in FIG. 2A. If a 4 pulse burst is desired, the carrier of FIG. 2A is turned on for 10 milliseconds (or 2.5 milliseconds times 4). A single such interval is distinctly perceived. If repetitive, constant stimulation is desired, these four-pulse bursts are initiated at a given burst repetition rate corresponding to the switching rate shown in FIG. 2A. Such initiation may occur at a rate ranging from 10 to 100 pulse bursts per second to produce a signal of the type designated 25 in FIG. 2A.

The repetition rate of the pulse burst has been found to affect the quality of the sensation produced. At low frequencies (10 to 20 pulse bursts per second), the sensation has a coarsely rasping quality which is unpleasant to some subjects. Above 20 pulse bursts per second, the sensation becomes smooth, approximating steady touch rather than vibration. At higher frequencies (50 pulse bursts per second and above) insufficient time is available for skin recovery in some subjects, and constant stimulation may tend to fade.

Figure 2B:
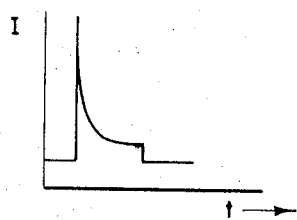

The actual sensation which is achieved varies in intensity as a function of the current in milliamperes passed in the steady state or final current in a single pulse as shown in FIG. 2B. In this respect, application of a rectangular voltage pulse to the skin tends to produce a current pulse (FIG. 2B) having an initial relatively high spike (the skin charging current), which falls to a steady state condition operative to produce the desired tactile sensation. The transient charging current may be, for example, 20 ma. falling to a steady state value of 3 to 6 ma. with a time constant of about 2 microseconds. It has been found that stimuli of less than 2 ma. (steady state) are not perceived by most subjects. On the other hand, stimuli of more than 20 ma. (steady state) reliably produce pain. Stimuli of 5 to 10 ma. (steady state) are optimal with a skin electrode having dimensions of the types described previously. The initial sensation may tend to be of the sharp punctuate type; but after 5 minutes of experience, subjects have reported that the sensation is comfortable, and totally unlike an electric shock.

Figure 2C:
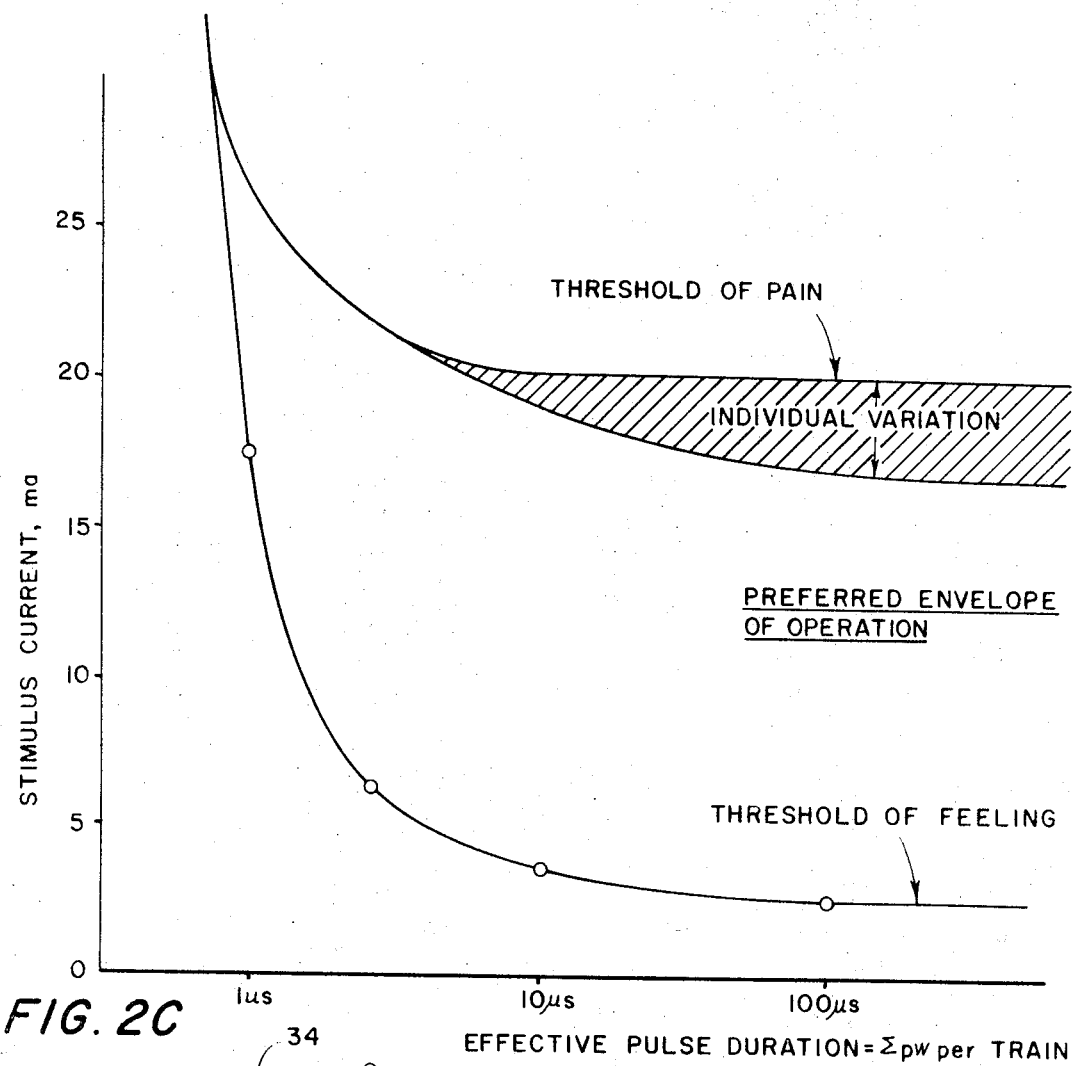

FIG. 2C summarizes the foregoing information. This FIG. show the variation of threshold of feeling and threshold of pain (including possible variations for different subjects) with electrical stimulus pulses or trains of pulses having the characteristics described above, and depicts the preferred envelope of operation lying between these thresholds. The abscissa in the FIG. 2C diagram represents the effective pulse duration, that is the sum of duration of all of the pulses in one train. The ordinate is the pulse amplitude in milliamperes. It can be seen from this diagram that the subjective level of sensation can be accurately predicted from the current, pulse width, and number of pulses in a train.

The optimal steady state current level mentioned earlier is maintained by a constant current source used as a stimulator, by which voltage is automatically adjusted according to skin resistance to pass a constant current level through each electrode. In the embodiment illustrated in FIG. 1, the hapticon tube 10 itself inherently acts as a constant current source because of the nature of the electron beam current; but if other signal processing arrangements are used, provision for a constant current should preferably be made. To provide for amplitude adjustments, a manual control 21 is preferably provided between the output of pulse train generator 20 and hapticon tube 10; and this permits the steady state current level to be adjusted within limits by the subject in accordance with his own preference and feelings of comfort.

Figure 3:
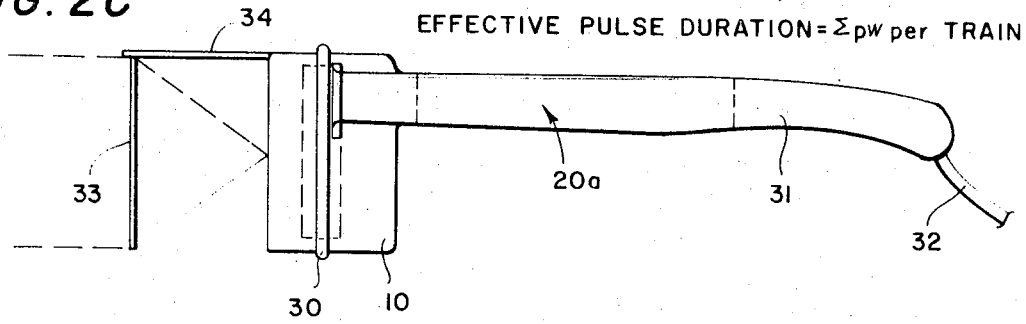
FIG. 3 is an illustrative side view of a pair of spectacles incorporating the hapticon system of FIG. 1.

A hapticon visual substitution system of the general type shown in FIG. 1 may, as mentioned previously, be readily mounted in or on a pair of spectacles, as shown in FIG. 3. In place of a lens, spectacle frame 30 can readily support a hapticon tube 10; and the stimulus wave generator 20 can, particularly if fabricated of integrated circuit components, be conveniently contained within one or both of the side temple members 31 of the spectacles, e.g., at the location designated 20a. Small, lightweight batteries used to energize generator 20 can be conveniently carried in the pocket, on the belt, on any convenient location; and can be connected to the hapticon and associated wave generator by a cable 32, a portion of which may also act as a connector the skin stimulator matrix.

For monocular vision, only one hapticon need be used, mounted on side only of the spectacles; and the other side can remain blank, or contain a counterweight dummy unit. For stereoscopic vision (to be discussed in reference to FIG. 6) a pair of hapticons can be used, mounted respectively in the two frame openings of the spectacles.

Hapticon 10 is associated with a Fresnel objective lens 33 mounted on an appropriate support 34 extending forward of the spectacle frame 30 to provide a spacing of 1 inch to 1 1/4inches between lens 33 and the photocathode of hapticon 10. Various types of optics can be used to produce the best image for a particular application, e.g., zoom, "fisheye," wide angle, telephoto, etc.

A zoom optics arrangement employing Fresnel lenses, adapted to be mounted adjacent the position of lens 33 in FIG. 3, is shown in FIG. 3A. Such a system may comprise three Fresnel (or conventional) lenses 33a, 33b, and 33c associated with mirrors 35a—35d inclusive. Lens 33a, which is the forwardmost lens of the system, is preferably replaceable, turret mounted, or otherwise selectable to provide three different conditions, i.e., extreme wide angle (approaching 180°), medium angle (e.g., about 30° field of vision), or narrow angle (e.g., about 5°) viewing to permit varied examination of an object. Lens 33b and its associated mirrors 35b and 35c are mounted for vertical movement, e.g., as designated at 36, relative to fixed position lenses 33a, 33c and fixed position mirrors 35a, 35d; and preferably permit a zoom of 10 : 1 or greater for each lens selected at 33a to provide continuous overlap in the field of view. Zoom can be effected by a manually controllable adjustment knob adapted to effect movement of the optics along arrow 36. When the lenses are of the Fresnel type, the overall optical arrangement can be extremely light in weight and readily mounted on a spectacles frame of the type shown in FIG. 3 without causing discomfort. It will be appreciated, of course, that other optical arrangements may be employed; and it will further be appreciated that all of these various optical systems, including that shown in FIG. 3A, can be employed in conjunction with other forms of the hapticon system, e.g., the head-mounted arrangement of FIG. 4, or a hand held unit.

When the hapticon photomultiplier system of the present invention is mounted in a pair of spectacles, or worn on the head or in a hat, normal head movements produce sufficient image translation across the skin to prevent fading of the image or adaptation to a fixed pattern of stimulus, thus insuring continued perception of visible objects. In such arrangements, head movements replace the normal nystagmus movements of the eyes which are responsible for maintaining continued perception of visual images in sighted individuals. (Images fixed upon the retina quickly fade from perception in the same manner as fixed tactile images.)

Figure 4:
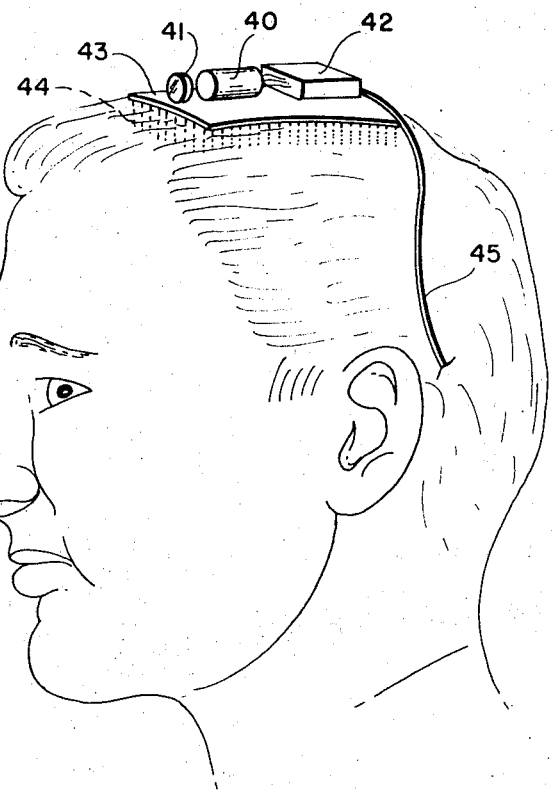
FIG. 4 illustrates an alternative embodiment of the present invention.
Figure 4A:
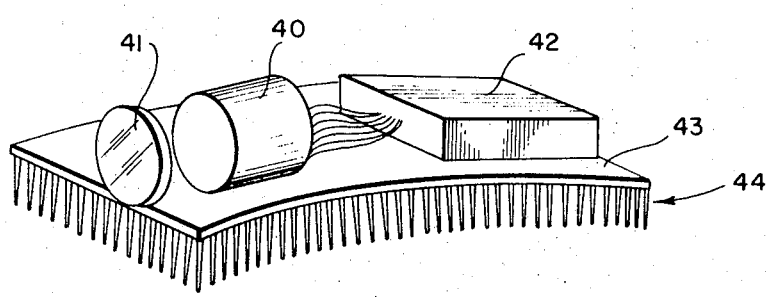
FIG. 4A is an enlarged view of the hapticon assembly shown in FIG. 4.

A head mounted hapticon system of the general type already described in reference to FIG. 1, is shown in FIGS. 4 and 4A. The hapticon itself has been designated 40, and is associated with appropriate optics of the types already described and diagrammatically illustrated at 41. These elements are, in the manner already described, associated with an appropriate pulse train generator package shown at 42. The several components 40—42 are, in one specific example shown in the drawings, mounted upon a semiflexible backing member 43 provided on its undersurface with an array of preferably flexible probes 44, e.g., 1000 such probes, adapted to push through the subject's hair and contact the skin of his scalp on one-eighth inch centers. The elements 43, 44 thus constitute an electrode blanket in engagement with the scalp of the subject. The several probes in array 44 can be appropriately interconnected to the output electrodes of hapticon 40 by means of conductors which extend through and are embedded in backing member 43.

The lens and hapticon portions 41, 40 of the system are, as illustrated, mounted toward the front of the electrode blanket, with the electronics package for generating the desired wave train being mounted to the rear of the blanket. However, other packaging arrangements may be employed, e.g., the electronic package 42 may be mounted to the sides of hapticon 40 or at some other location. Battery power for short term operation can be effected by means of one or more battery units carried by or near backing member 43; but if the batteries employed are relatively heavy or large in size, the batteries can be carried in the subject's pocket, on his belt, or at some other convenient location with a battery cable 45 being provided for connection between such a remote battery and the head-mounted hapticon unit.

The system of the present invention readily lends itself to the conveying of color information to the subject. One arrangement of this general type is shown in FIG. 5A, and comprises three separate hapticon units 50, 51 and 52 each of which is associated with its own optical system 50a, 51a, and 52a. Three filters 53, 54 and 55, corresponding respectively to the three primary colors, register three different color images on the hapticon tube 50, 51, and 52 respectively; and the output electrodes of the hapticons 50—52 are connected in parallel with one another and are then connected to stimulus electrodes in engagement with the subject's skin.

The hapticon units 50—52 each comprise a hapticon system of the general type shown in FIG. 1; and each such system includes a pulse train generator operative in the manner already described. Each hapticon system should operated at a separate distinctive carrier or modulating frequency, whereby three distinctly different paralleled outputs are conveyed to the skin representative of the three primary colors. Full octave frequency differences can be employed for the three modulating frequencies, e.g., modulating frequencies such as 15, 30, and 60 Hz. respectively may be employed. Alternatively, the modulating frequencies may be incommensurate multiples of one another, e.g., 15, 27, and 53 Hz. By training and practice the subject becomes adept at distinguishing the different frequencies of stimulation from one another, and becomes able to correlate the different frequencies sensed with different colors. Thus the single set of stimulating electrodes is operative to convey color information to the skin of a blind subject.

An alternative arrangement is shown diagrammatically in FIG. 5B. In the arrangement of FIG. 5A the three hapticon units 50—52 employ three different envelopes for the respective hapticon tubes; but this is not mandatory. A single evacuated envelope 56 can be provided with three spaced microchannel plates 18a, 18b, and 18c, each of which is associated in turn with its own separate pulse train generator. The photocathode on the front face of this single envelope may be divided into three segments 56a, 56b and 56c which are covered respectively by three primary color filters, and associated respectively with three lens systems operative to image objects on each photocathode segment. The output electrodes of this composite hapticon tube would accordingly provide the desired color information in the same manner already described in reference to FIG. 5A.

The single-envelope hapticon arrangement of FIG. 5B need not employ three separate microchannel plates, but can actually employ a single microchannel plate of sufficient size to cooperate with the three separate photocathode areas 56a, 56b, and 56c, with three separate waveform generators connected respectively between the common microchannel plate and the three photocathode segments. In an alternative arrangement of this type, different groups of tubes in the common microchannel plate cooperate respectively with the different photocathode areas to achieve the desired color information transmission.

A further arrangement is shown in FIG. 5C, and embodies a single hapticon 57 associated with lens system 58 and with a rotating color filter disc 59 interposed therebetween. A 1 inch diameter hapticon 57 requires only a 2 inch diameter rotating color filter disc. Several modulating frequencies should again be applied to the hapticon, and the frequency used at any given time should be switched in synchrony with rotation of disc 59 to effect a desired modulation corresponding to the primary color filter segment then in front of hapticon 57. Red hues could be represented e.g. by a 20 Hz. modulating frequency, green by a 30 Hz. modulating frequency, and blue by a 40 Hz. modulating frequency; but any alternative frequencies, such as those suggested earlier in reference to FIG. 5A, could also be employed. The color information output achieved by the system of FIG. 5C takes the form of serial information, rather than parallel information.

Figure 6:
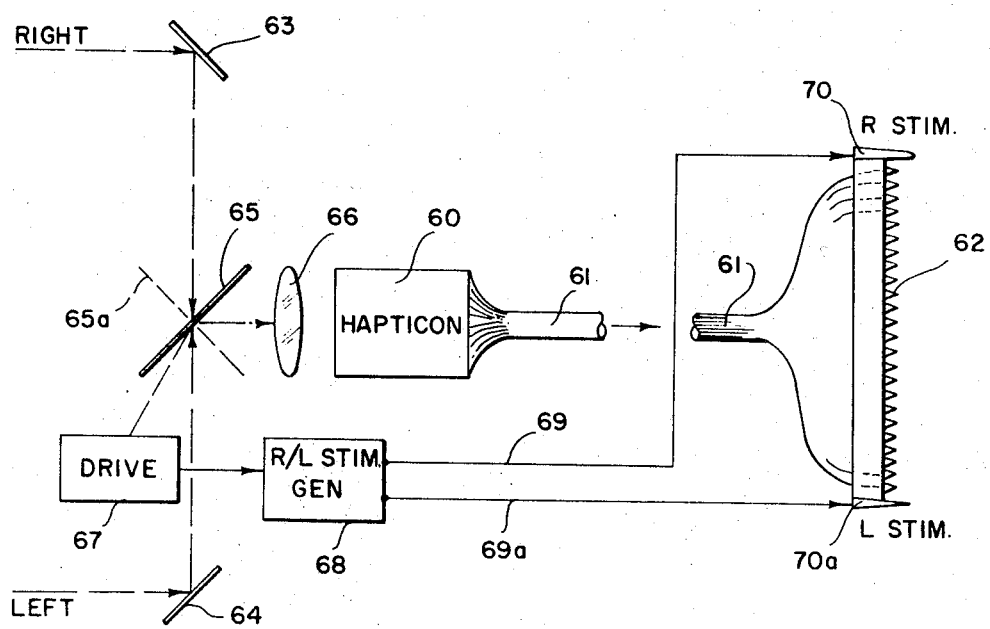
FIG. 6 is an illustration of a hapticon system constructed in accordance with the present invention adapted to convey stereoscopic information.

To achieve a stereoscopic presentation, a single hapticon tube connected to an electrode matrix for stimulating the skin may be caused to shift its point of view alternately between left and right positions whose base line separation corresponds approximately to the interocular separation. (Enhanced depth perception may be achieved by wider separation.) An arrangement of this type is shown in FIG. 6 wherein hapticon 60 has its output couple via cable 61 to an electrode matrix 62. Visual information is impressed upon hapticon 60 by means of a pair of fixed position mirrors 63, 64 cooperating with a rotating or nutating mirror 65 and an appropriate lens system 66. Mirrors 63 and 64 are looked at alternatively by mirror 65 as it shifts between the full line position shown in FIG. 6 (for "left" viewing) and the broken line position 65a (for "right" viewing).

Rotation or nutation of mirror 65 can be effected by an appropriate drive mechanism 67, e.g., a small electric motor associated with an appropriate gear train or cam arrangement. Operation of drive means 67 may also be caused to operate a right-left stimulus generator 68 operative to produce a signal on either line 69 or 69a for application respectively to a pair of electrodes 70 and 70a located respectively at the right hand and left hand edges of electrode matrix 62. The operation is such that, when drive means 67 causes mirror 65 to reflect a right hand point of view image to hapticon 60, generator 68 applies a clueing stimulus to electrode 70 to so inform the subject; and on alternate half cycles, when mirror 65 applies a left hand view point image to hapticon 60, electrode 70a is similarly energized to so inform the subject. By this arrangement, therefore, visual information taken from two different view points is regularly and alternately used to provide energization to electrode matrix 62; and the subject is simultaneously informed just which point of view is being represented at any particular time.

Alternatively, two hapticon tubes can be employed with an electronic switch providing time sharing between them by connecting the pulsed accelerating voltage source to each tube in succession.

In the system of FIG. 6, only one plane of an object being viewed is represented. This plane is determined by the intersection of the axes of the right and left hand mirrors 63, and 64. By converging the angles of mirrors 63, 64, the subject can effectively fix, fuse or "focus" on near objects (within 20 feet), making them appear as a single image in the stimulator matrix presentation. Thus, by knowing the mirror angles, a subject can estimate range to a given object. Objects in front of or behind this "focal plane" would appear as double images; and the double image separation would increase with increasing range. Means can accordingly be provided to adjust the angles of mirrors 63, 64; and the actual mirror angle convergence can be readily calibrated in terms of range from the subject.

Figure 7A:
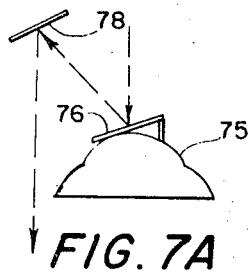
FIG. 7A is an illustrative view of a contact mirror arrangement which may be employed in the system of FIG. 7.
Figure 7:
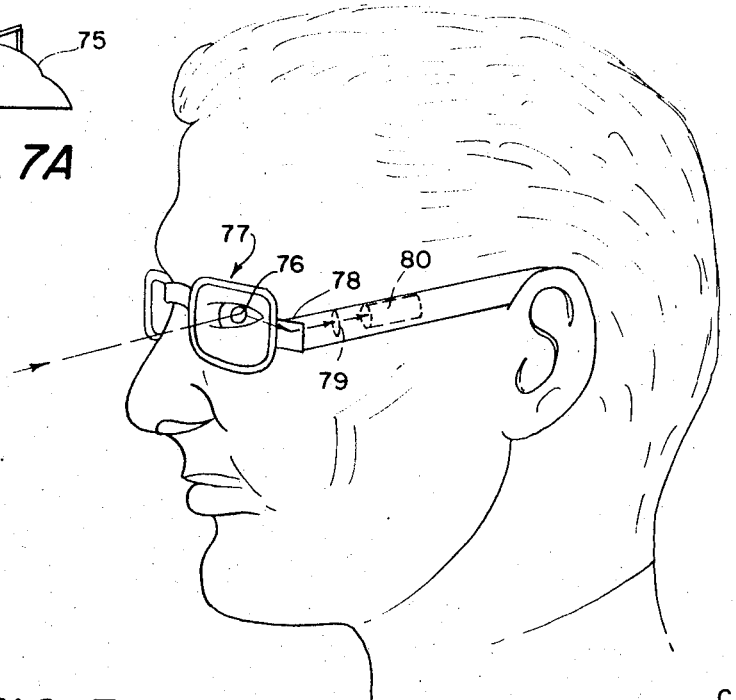
FIG. 7 illustrates another embodiment of the present invention employing ocular feedback.

Due to the fact that the hapticon of the present invention can be made in very small sizes, it is also possible to incorporate a visual substitution system of the type described in or on a pair of spectacles or other appropriate head harness in a manner which makes use of ocular feedback. An arrangement of this type is shown in FIGS. 7 and 7A. The blind subject can be provided with mirrored contact lenses for his blind eyes, in an arrangement taking the general form shown in FIG. 7A. The lens 75 shown in FIG. 7A is of the scleral contact type, and carries a plane or curved mirror 76 adapted to be carried by and moved with normal eye movements of the wearer, and cooperating with a spectacles mounted mirror 78 in the manner illustrated in FIGS. 7 and 7A. A scleral lens 75 is preferred to the corneal type since it minimizes positional instability of the mirror while permitting movement of the mirror with normal eye movement; but similar results can be achieved by employing a counterweighted corneal contact lens for supporting a mirror such as 76.

The contact lens arrangement of FIG. 7A cooperates with a pair of spectacles 77, the side temple pieces of which carry an angled relay mirror 78, lens means 79 and a hapticon 80. Visual information reflected by contact mirror 76 is relayed by mirror 78 and optics 79 to hapticon 80, and may then be coupled as electrical stimulating signals to an electrode matrix array of one of the types already described. Normal eye movements operate to direct and change the angle of view of the hapticon 80 (or pair of such hapticons mounted respectively in the opposing side pieces of the spectacles 77). By the system of FIG. 7, the normal vestibular and ocular reflexes of the subject are used as part of the visual substitution system.

While we have thus described preferred embodiments of the present invention, many variations will be suggested to those skilled in the art, and some of these variations have already been mentioned. Other variations will be apparent; and it must therefore be understood that the foregoing description is intended to be illustrative only and not limitative of our invention. All such variations and modifications as are in accord with the principles described, are meant to fall within the scope of the appended claims.

We claim:

1. A visual substitution system comprising signal generator means operative to produce output signals in the form of a plurality of spaced pulse bursts, each of said bursts comprising a plurality of pulses having a repetition rate up to 10,000 Hz. and said bursts being spaced from one another to occur at a repetition rate up to 100 pulse bursts per second, an artificial receptor responsive to visible information and coupled to said signal generator means for modulating the amplitude of said pulses in accordance with the brightness of different portions of said visual information, and means for coupling said modulated pulses to the skin of a subject to achieve a patterned electrical stimulation of the skin.

2. The system of claim 1 wherein each of said pulses is substantially rectangular in waveform, each pulse having a width of between 1 and 500 microseconds.

3. The system of claim 1 wherein said artificial receptor comprises a photocathode, an array of collector anodes spaced from said photocathode, and an image intensifier positioned between said photocathode and said anode array, said signal generator means being electrically coupled to said image intensifier.

4. The system of claim 3 wherein said image intensifier comprises a secondary emission microchannel plate.

5. The system of claim 4 wherein the number of anodes in said array is less than the number of channels in said microchannel plate, whereby electron image beam current from a plurality of said channels is directed onto each of said anodes.

6. The system of claim 5 including a matrix of spaced electrodes for engagement with the skin of a subject, and conductor means coupling each of the anodes in said array to a corresponding one of the electrodes in said matrix.

7. A visual substitution system comprising an artificial receptor for converting visual information into electrical signals; said receptor comprising a photocathode, an array of collector anodes spaced from said photocathode, and a secondary emission microchannel plate image intensifier positioned between said photocathode and said anode array; optical means for projecting visual information onto said photocathode; a matrix of spaced electrodes for engagement with the skin of a subject; and connector means electrically coupling the anodes in said array to the electrodes in said matrix.

8. The system of claim 7 including pulse generator means coupled to said artificial receptor for converting said visual information into pulses of electrical information at said collector anodes.

9. The system of claim 8 wherein said pulse generator means is operative to convert said visual information into substantially rectangular pulses occurring at a repetition rate up to 10,000 Hz.

10. The system of claim 7 wherein said artificial receptor is mounted on a pair of spectacles.

11. The system of claim 8 wherein said artificial receptor is mounted on the frontal piece of a pair of spectacles, said pulse generator means being carried by at least one of the side temple members of said pair of spectacles.

12. The system of claim 7 wherein said matrix of spaced electrodes is mounted for support on the head of a subject with said electrodes in engagement with the subject's scalp.

13. The system of claim 12 wherein said artificial receptor and said matrix of spaced electrodes are mounted on a common support member.

14. The system of claim 7 wherein said photocathode comprises a plurality of spaced photocathode sections, different color filter means positioned respectively between said optical means and said spaced photocathode sections, and a plurality of different frequency modulating pulse generators coupled respectively to said plurality of photocathode sections.

15. The system of claim 14 wherein said artificial receptor includes a plurality of said microchannel plates disposed adjacent said plurality of photocathode sections respectively.

16. The system of claim 15 wherein said plurality of photocathode sections and said plurality of microchannel plates are mounted in a common evacuated envelope.

17. The system of claim 15 wherein said plurality of photocathode sections and said plurality of microchannel plates are mounted respectively in separate evacuated envelopes.

18. The system of claim 7 wherein said optical means includes at least one movable element for varying the nature of the visual information which is projected onto said photocathode.

19. The system of claim 18 wherein said movable element comprises a movable mirror for changing the view point of visual information projected onto said photocathode, and drive means for regularly varying the position of said movable mirror.

20. The system of claim 19 including signal means operative in synchronism with said drive means for coupling signals to the skin of a subject informing the subject of the viewpoint of visual information being projected onto said photocathode.

21. The system of claim 18 wherein said movable element comprises mirror means mounted for support on and movement with the eye of a subject for controlling the direction of view of said artificial receptor.

22. The system of claim 7 comprising a plurality of said artificial receptors, and control means for rendering different ones of said receptors operative at different times.